July 22, 1958

J. G. LINDEMAN ET AL 2,843,948

LAND LEVELER

Filed March 18, 1954

*INVENTORS.*
JESSE G. LINDEMAN
FRANK H. HOREY

BY

ATTORNEYS

July 22, 1958  J. G. LINDEMAN ET AL  2,843,948
LAND LEVELER
Filed March 18, 1954  5 Sheets-Sheet 3
FIG. 3
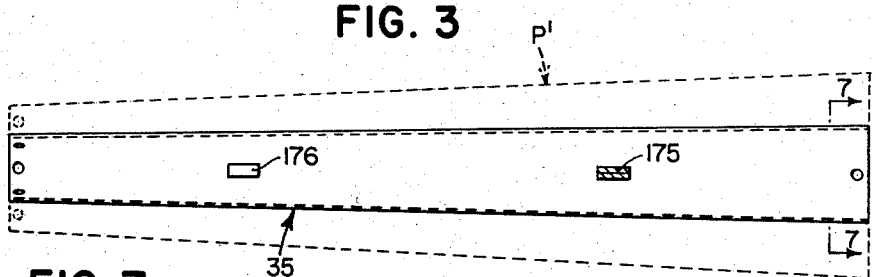
FIG. 7 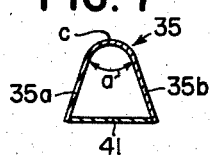 FIG. 8 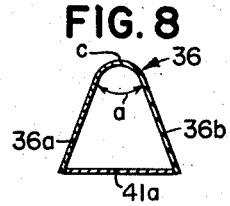 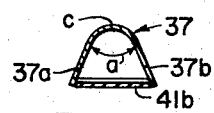 FIG. 9
FIG. 4
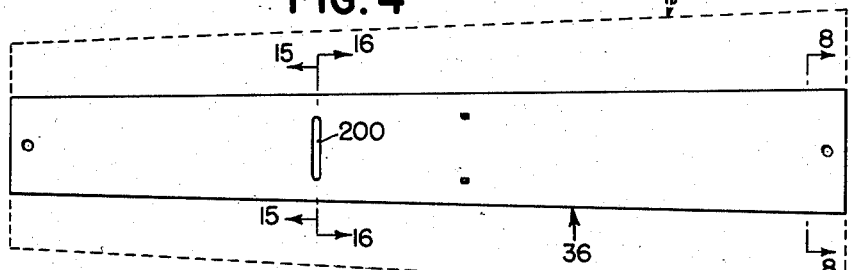
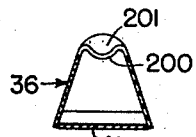 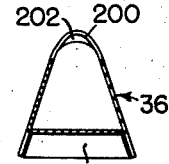
FIG. 15  FIG. 16
FIG. 5
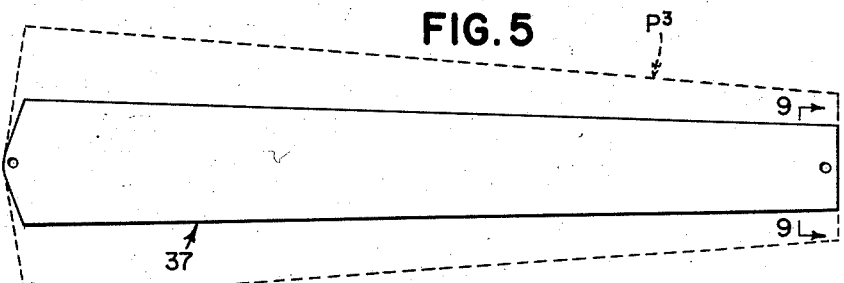
INVENTORS.
JESSE G. LINDEMAN
FRANK H. HOREY
BY
ATTORNEYS July 22, 1958   J. G. LINDEMAN ET AL   2,843,948
LAND LEVELER
Filed March 18, 1954   5 Sheets-Sheet 4
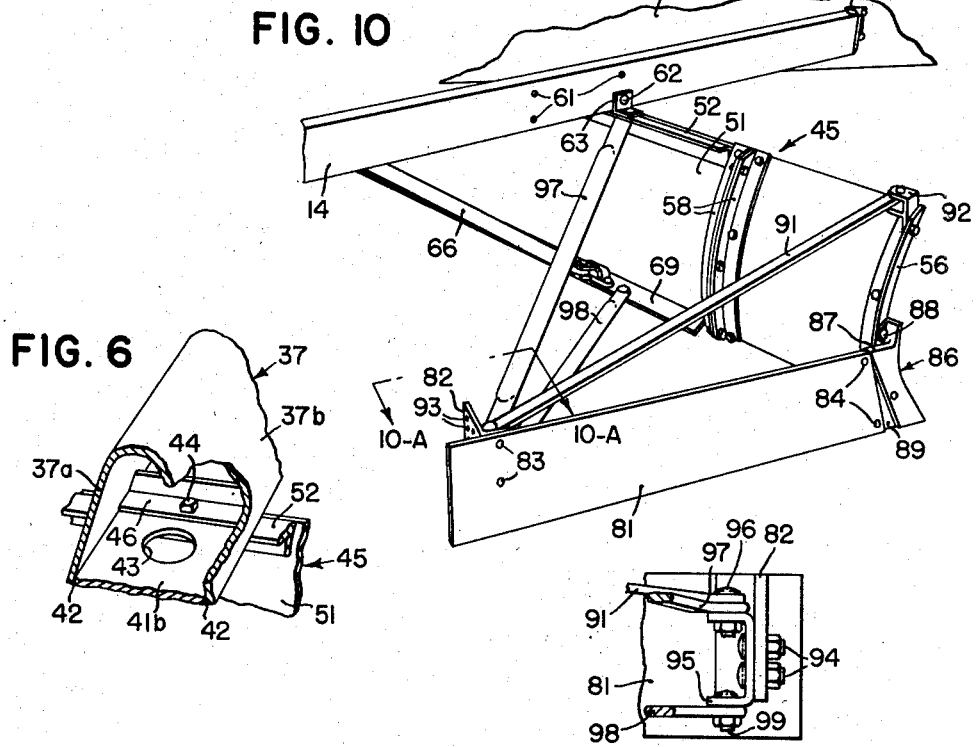
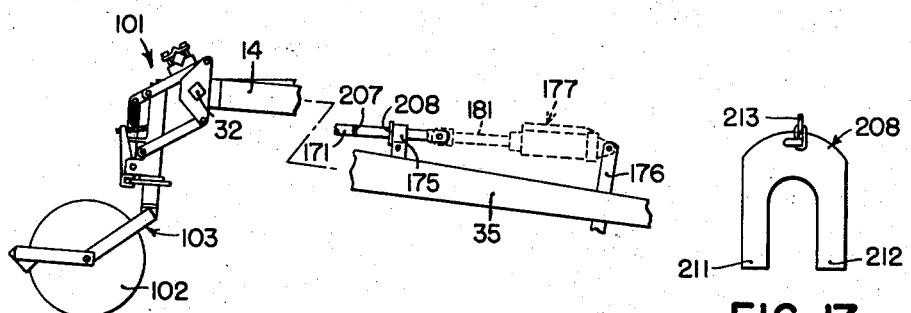
INVENTORS.
JESSE G. LINDEMAN
FRANK H. HOREY
BY
ATTORNEYS July 22, 1958 J. G. LINDEMAN ET AL 2,843,948
LAND LEVELER
Filed March 18, 1954 5 Sheets-Sheet 5

INVENTORS.
JESSE G. LINDEMAN
FRANK H. HOREY
BY
ATTORNEYS

United States Patent Office 2,843,948
Patented July 22, 1958

2,843,948

LAND LEVELER

Jesse G. Lindeman, Yakima, and Frank H. Horey, Seattle, Wash., assignors to Deere & Company, Moline, Ill., a corporation of Illinois Application March 18, 1954, Serial No. 417,105

20 Claims. (Cl. 37—178)

The present invention relates generally to farm implements and more particularly to such ground-working tools as land levelers for leveling fields and other areas preparatory to irrigating and other operations. In its broader aspects, the present invention relates to scrapers and other earth-shaping machines, such as those for building farm roads, irrigation borders, and handling a variety of other earth-moving jobs.

The object and general nature of the present invention is the provision of an implement for land-leveling or land-finishing operations, particularly constructed to produce a level finished surface with fewer trips across the field and with more accurate control of the depth of cut. Further, it is a feature of this invention to provide means whereby the depth of operation is controlled by caster wheel means, which latter is, however, locked out of operation when the blade is raised, as for transport. Additionally, the caster wheels are provided with spring-loaded centering mechanism that, in operation, prevents the wheels from swinging when making a straight run or when turning with an empty blade. However, the spring-loaded centering mechanism is so designed that the gauge wheels will caster when making a sharp turn with a load in the shaping blade.

Another important feature of the present invention is the provision of means whereby the shaping blade may be disposed either in a transverse position or in an angled working position, thus adapting the machine for use in building farm roads, making ditches and the like, and similar operations.

Still further, an additional feature of the present invention is the provision of improved means for raising and lowering the leveling blade, with associated means for locking the raising and lowering means in position, thereby making it easy and convenient to remove the raising and lowering power unit, leaving the blade locked in its raised position. An additional feature of this invention is the provision of transport wheels, in addition to the gauge or ground-contacting wheels, such transport wheels usually being equipped with rubber tires and disposed closely behind the blade. The transport wheels provide for relatively high speed travel over paved roads and the like, or under other conditions where transport of the implement on the ground or gauge wheels is not desirable or feasible.

These and other objects and advantages of the present invention will be apparent to those skilled in the art after a consideration of the following detailed description, taken in conjunction with the accompanying drawings, in which:

Fig. 3 is a view of the front section of the main frame member.

Fig. 4 is a similar view of the intermediate section of the main frame member.

Fig. 5 is a similar view of the rear section of the main frame member.

Fig. 6 is a fragmentary view showing the attachment of the central portion of the blade to the main frame member.

Fig. 7 is a sectional view taken on the lines 7—7 of Fig. 3.

Fig. 8 is a sectional view taken on the line 8—8 of Fig. 4.

Fig. 9 is a sectional view taken on the line 9—9 of Fig. 5.

Fig. 10 is a perspective view showing the land side attachment adapted to be used with the blade when the latter is operated in an angled position, as for building roads, digging ditches and the like.

Fig. 10a is a fragmentary end view of the lower rear portion of the land side attachment, taken along the line 10a—10a of Fig. 10.

Fig. 15 is a sectional view taken on the line 15—15 of Fig. 4.

Fig. 16 is a sectional view taken on the line 16—16 of Fig. 4.

Fig. 17 is a detail view of the transport lock collar.

Fig. 18 is a fragmentary side view showing the positions of the gauge wheel and other parts in the transport position of the implement when it is being transported on the gauge wheels.

Figure 1:
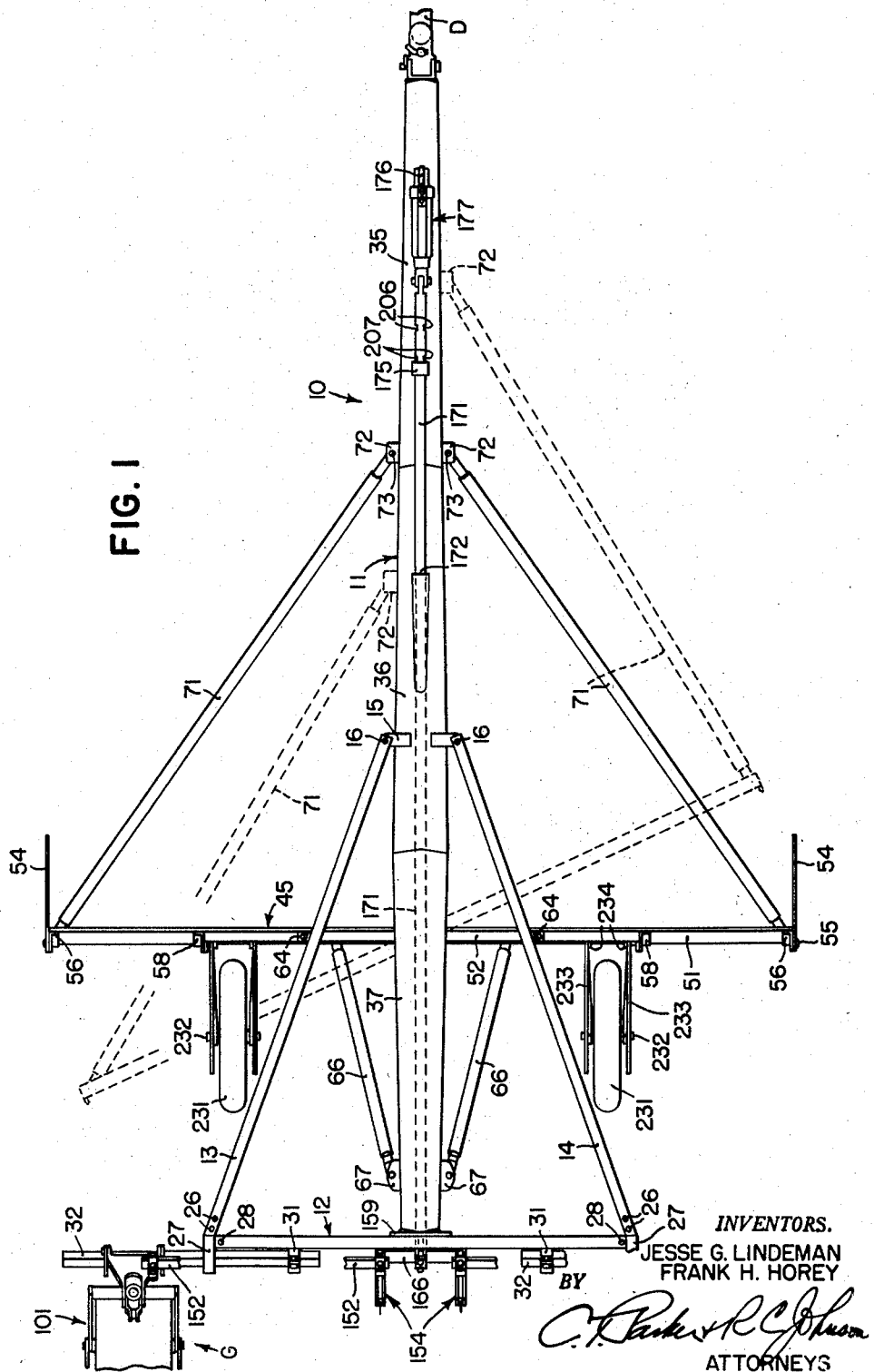
Fig. 1 is a plan view of a land leveler in which the principles of the present invention have been incorporated.
Figure 2:
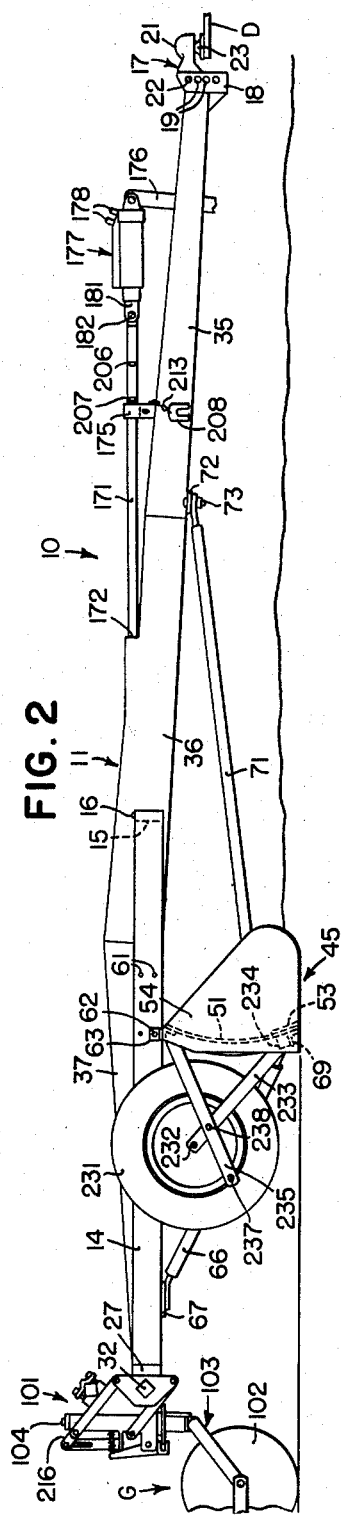
Fig. 2 is a side view of the implement shown in Fig. 1.

Referring first to Figs. 1 and 2, the present invention is shown as incorporated in a tractor-propelled land leveler that includes a main frame 10 which comprises a fore-and-aft extending main frame member 11 and a transverse frame member 12 secured to the rear end of the frame member 11 and connected at its ends through braces 13 and 14 with the frame member 11 at a generally intermediate point, as through brackets 15 and connecting pins or bolts 16. The front end of the main frame member 11 carries a variable height hitch device 17 that is made up of a pair of generally vertically disposed, laterally spaced apart plate sections 18 secured to the front end of the frame bar 11 by any suitable means, such as welding, and provided with a plurality of vertically spaced apart pin-receiving openings 19. The hitch 17 also includes a socket member 21 that is adapted to be connected in different vertical positions to the plate section 18 by a connecting pin 22 or the like, the socket member 21 being disposed in different vertical positions to accommodate the implement to tractors of which the drawbar D of which is disposed at different heights. The hitch device 17 is completed by a ball member 23 that is attached to the tractor drawbar D. As best shown in Fig. 1, the rear ends of the braces 13 and 14 are connected, as by bolts 26, to clamp members 27, each of the latter having an inwardly extending section to which the adjacent end of the transverse frame bar 12 is connected, as by a bolt or pin 28. The transverse frame bar 12 also carries laterally inwardly disposed clamping means 31, and a pair of square gauge wheel receiving bars 32 are connected by the clamps 27 and 31 to the frame 10 at the rear end thereof, the bars 32 being fixedly secured to the rear frame bar 12 in different lateral positions.

The gauge wheel means G, which is adjustably connected to the bars 32, will be described later.

The frame member 11 is of particular construction. As shown in Figs. 1 and 2, the frame member 11 is made up of three sections 35, 36 and 37, each section being generally of inverted V-shaped formation in section and formed by bending flat plate stock into the desired configuration. In order to simplify the fabrication of the frame member and to reduce the cost of construction, each of the members 35, 36 and 37 has the same angle $a$ at the apical portion of the frame section, as best shown in Figs. 7–9; that is, the angle $a$ between the side sections 35$a$ and 35$b$, 36$a$ and 36$b$, and 37$a$ and 37$b$, is constant, and likewise the curvature $c$ at the apical portion in each of the frame sections 35, 36 and 37 is the same. The advantage of this arrangement is that each of the frame sections 35, 36 and 37 can be formed on the same bending dies, thereby simplifying the manufacture of the frame member 11. The side sections 35$a$, 35$b$, etc. vary in generally vertical dimension, as will be clear from Figs. 7, 8 and 9, and likewise the length and shape of the flat plate stock sections $P^1$, $P^2$ and $P^3$, Figs. 3–5, may vary but this is not an expensive item, since the plate stock may be trimmed as desired without extensive equipment, whereas there is a considerable advantage in being able to use the same bending dies to shape the three frame sections. While in Figs. 1 et seq., we have shown a frame member made up of three sections, it will be understood that the number of sections may vary as desired or necessary, depending upon the desired over-all length of the land leveler frame.

Figure 20:
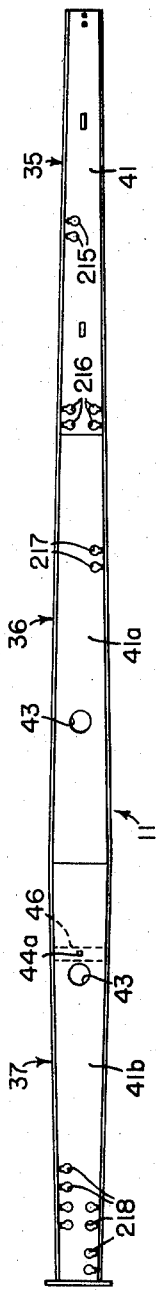
Fig. 20 is a bottom view of the main frame member, showing attaching points.

The frame member 11 when entirely completed, is in the nature of a box section, and the box section is produced by welding flat plate sections 41, 41$a$ and 41$b$ to the lower portions of the side sections of the V-shaped parts 35, 36 and 37. As best shown in Fig. 6, which is a perspective view showing a portion of the rear frame section 37, the associated flat plate 41$b$ is welded, as at 42, to the lower edge portions of the side sections 37$a$ and 37$b$ substantially at the lower edges of the side sections. This provides a flat downwardly facing surface whereby, at any point along the length of the frame member 11, tools and the like may be fixed or clamped firmly and rigidly to the lower side of the frame member 11 with generally flat contact therebetween. For example, as shown in Fig. 20, the flat plate sections 41, 41$a$ and 41$b$ are provided with a number of openings, some in the form of sets of keyhole slots 215, 216, 217 and 218 in which bolts may be disposed, the heads of the bolts being insertable through the larger openings of the keyhole slots and then moved into the narrow sections, to provide for securely bolting brackets and other parts to the frame. Further, and as shown in Figs. 6 and 20, some or all of the plates 41, 41$a$ and 41$b$ are provided with hand holes 43 to provide for access to the interior of the box section. As shown in Fig. 6, a bolt 44 is used to connect the central portion of the scraper blade 45 to the rear section 37 of the frame member 11. This portion of the frame section is reenforced by a crossbar 46, preferably in the form of an angle, and the latter and the plate 41$b$ have registering holes 44$a$ to receive the bolt 44.

As will be seen from Fig. 2, the center frame section 36 is of a greater vertical dimension than the other frame section, the forward end of the section 36 corresponding in vertical dimension to the rear end of the forward section 35, and the rear end of the section 36 corresponding to the vertical dimension of the forward end of the rear section 37. This, in effect, provides a beam which is materially strengthened by virtue of the frame member 11 being a box section as described above, in which the generally central portion is of the greater vertical dimension, and it is to this portion, which in the preferred form of the invention is about two thirds of the length of the frame member rearwardly of the front end thereof, that the blade 45 and associated frame braces are connected.

The blade 45 is itself of generally conventional construction, comprising an arcuate transverse plate 51 along the upper edge of which is connected a transverse angle member 52, shaped to fit against the rear face along the upper edge of the plate 51, and a lower cutting member 53, together with suitable end plates 54 which preferably are removable, being connected by bolts 55 to end angles 56 which serve, not only to receive the rear edges of the end plates 54, but also serve as reenforcing means for the blade plate 51. The angles 56 are curved to fit against the back side of the plate 51, and are augmented by other similarly shaped angles 58. The blade is connected, as described above and as shown in Fig. 6, centrally to the main frame member 11. Laterally outwardly of the frame member 11, the blade 45 is rigidly connected to the frame brace bars 13 and 14. To this end, the web sections of the brace bars 13 and 14, which preferably are channels, are provided with a plurality of openings 61 especially adapted to receive bolts 62 which connect angle clips 63 to the brace bars. The horizontal portions of the angle clips 63 are bolted, as at 64, to the blade upper angle 52. The central section of the lower portion of the blade 45 is rigidly connected to the rear end portion of the frame bar 11 through center braces 66, the rear ends of which are connected to brackets 67 fixed to the rear frame section 37. The forward ends of the brace bars 66 are connected to the lower portion of the blade 45 by any suitable means, such as by being bolted or otherwise connected to a cross angle 69 at the lower edge of the blade 45. In this way, the lower rear portion of the blade is rigidly braced and is thus held in the proper position so as to withstand the relatively large forces to which the blade 45 is subjected in operation.

The outer ends of the blade 45 are reenforced by diagonal braces 71, the rear ends of which are connected in any suitable way to the outer lower portions of the blade 45 and the forward ends of which are connected by bolts 73 to detachable brackets 72 fixed to the frame section 35 by bolts inserted in the keyhole slots 216 (Fig. 20). By loosening the bolt 44 (Fig. 6), detaching and moving the brace clips 63 to different locations along the frame brace bars 13 and 14 and the blade angle 52, and removing the brackets 72 from the slots 216 and fastening them at the slots 215 and 217 (Fig. 20), the blade 45 may be disposed at an angle to the frame 10, as shown in dotted lines, Fig. 1. This provides means for building roads and other operations requiring an angled blade, rather than one that is arranged directly transversely of the frame. When operating the blade 45 at an angle, it is desirable, first, to remove the end plates 54 and, second, to provide an adjustable landside for the forward end of the angled blade. The adjustable landside is best shown in Fig. 10 and will now be described.

When the blade 45 is disposed in an angled position, it is desirable to have a landside so as to take the side thrust incident to the operation of the blade in its angled position. Accordingly, the present invention contemplates an elongated landside plate 81 to the rear end of which a generally vertically disposed adjustment bracket 82 is bolted, as at 83. The front end of the landside plate 81 is apertured to receive connecting bolts 84 that attach the landside plate 81 to a generally plow-shaped point member 86. The latter includes a rearwardly extending blade-receiving section 87 which includes a flange 89 that is offset laterally inwardly. The flange 89 has slotted openings receiving the bolts 84. The member 86 is also apertured to receive one or more bolts 88 that connect the member 86 to the end of the blade 45.

The rear end of the landside plate 81 may be raised or lowered after loosening the bolts 84, by virtue of the slotted openings receiving the bolts 84. In this way the level of the landside may be adjusted.

The rear portion of the landside plate 81 is reenforced by an upper outer brace 91 that is connected at its forward end to an attachment member 92 carried by the upper end portion of the blade 45, the rear end of the brace 91 being connected to the bracket 82 by an upper bolt 96 (Fig. 10a). The member 82 has a plurality of openings 93 in selected ones of which bolts 94 may be disposed, the bolts 94 serving as means adjustably fixing a U-shaped clip 95 to the bracket 82. The rear ends of the braces 91 and 97 are fixed to the clip 95 by the bolt 96, and the rear end of the lower brace 98 is connected to the lower part of the clip 95 by a bolt 99. The forward ends of the braces 91, 97 and 98 are connected by any suitable means to the upper and lower portions of the blade 45. The landside member and its bracing and attaching means are, of course, removed from the blade 45 when the latter operates in a transverse position, as shown in full lines, Fig. 1.

Figure 11:
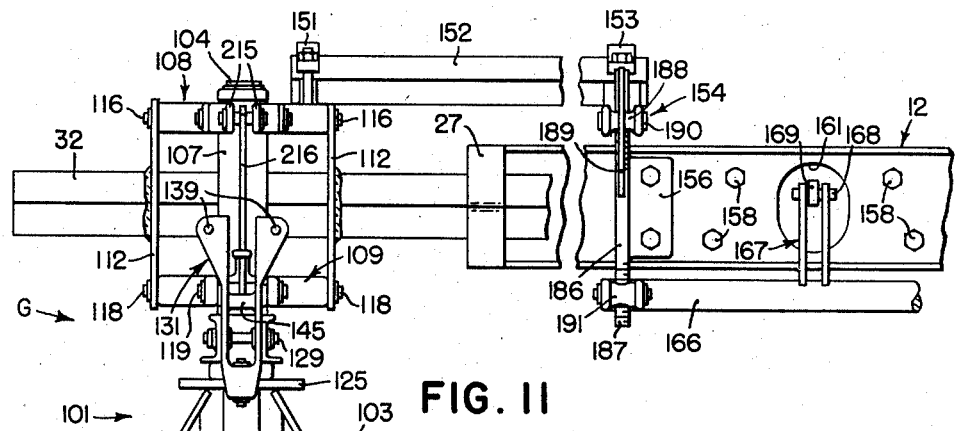
Fig. 11 is an enlarged fragmentary rear view of the left-hand gauge wheel and associated parts.
Figure 12:
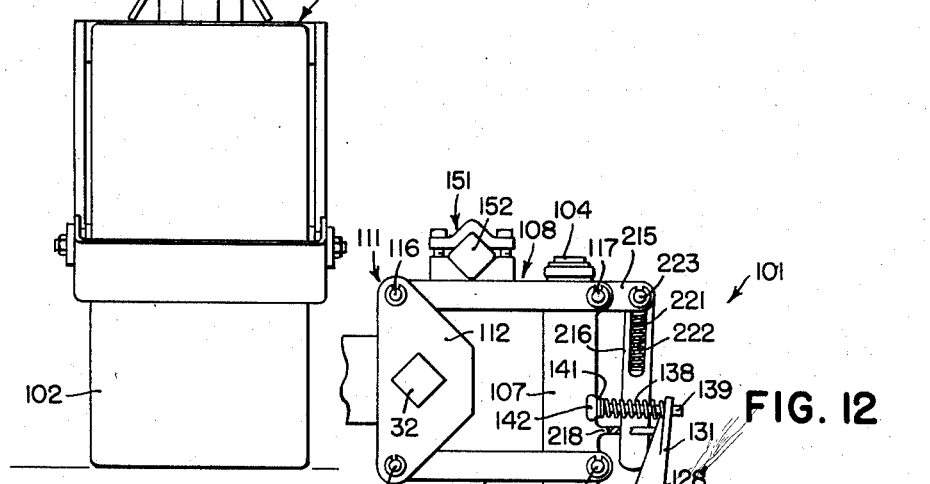
Fig. 12 is a side view of the gauge wheel arrangement shown in Fig. 11.

The rear gauge wheel means will now be described. According to the principles of the present invention, and as illustrated in Figs. 1, 11 and 12, the gauge wheel means comprises a pair of castering ground wheel units 101. Each castering ground wheel unit includes a wide tread type of ground wheel 102 journaled for rotation in a yoke member 103 having a vertical spindle section 104, the latter being disposed for rocking movement about a generally vertical axis as defined by a vertical sleeve section 107 that is connected by upper and lower link means 108 and 109 to a vertical bracket structure 111 that comprises a pair of plates 112 apertured to receive, and secured as by welding to, the associated transverse frame bar 32. Each upper link 108 includes front and rear bifurcated sections that are apertured to receive pivot pins 116 and 117 by which the upper link 108 is connected at its front end with the bracket structure 111 of the frame 10 and at its rear end with the upper portion of the associated gauge wheel spindle sleeve 107. The lower link member 109 is of similar construction having apertured bifurcated portions carrying front and rear pins 118 and 119 connected, respectively, with the frame bracket 111 and the gauge wheel spindle sleeve 107. Each of the gauge wheel units 101, the left-hand unit being shown in Fig. 1 while the right-hand unit appears in Fig. 2, is of like construction, and hence a description of one will suffice.

Figure 13:
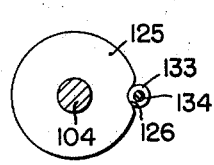
Fig. 13 is a sectional view taken on the line 13—13 of Fig. 12, showing the caster wheel locking disk.

The lower end of each spindle section 104 carries a disk 125 fixed thereto, the disk having a notch 126 formed therein. Disposed at the rear side of each sleeve section 107 is a pair of bracket lugs 128 that are apertured to receive a pin 129 by which a lock lever 131 is mounted on the spindle sleeve 107. The lower end of the lever 131 is provided with a bifurcated section 132 that receives a roller 133 mounted on a pin 134 carried by the section 132. The roller is adapted to enter the notch 126 under the action of a pair of compression springs 138 that are arranged to bear rearwardly against the upper end of the lever 131. Each spring 138 is mounted on a pin 139 the rear end of which is slidably received in an opening in the upper end of the associated lever 131. The forward end of the pin 139 includes an abutment section 141 disposed just rearwardly of the front end thereof, which latter part seats in an opening in a lug 142 carried by the spindle sleeve 107. As will best be seen from Fig. 11, there are two springs 138 and associated parts for each of the levers 131, the latter being a bifurcated member with a strengthening interconnecting section 145 (Fig. 11) disposed just above the pivot pin 129. The sides of the notch 126, as best shown in Fig. 13, flare outwardly so that, while the springs 138 are effective to prevent the wheel 102 from castering in a normal operation, the springs 138 may be overcome and the ground wheels 102 permitted to caster when, with the blade loaded, a sharp turn is made, the machine pivoting about the load as a center. The interconnecting section 145 of each of the levers 131 functions in connection with castering lockout mechnism that will be described later. By loosening the clamps 27 and 31 (Fig. 1) the lateral position of the gauge wheel units 101 may be changed, as desired.

Figure 14:
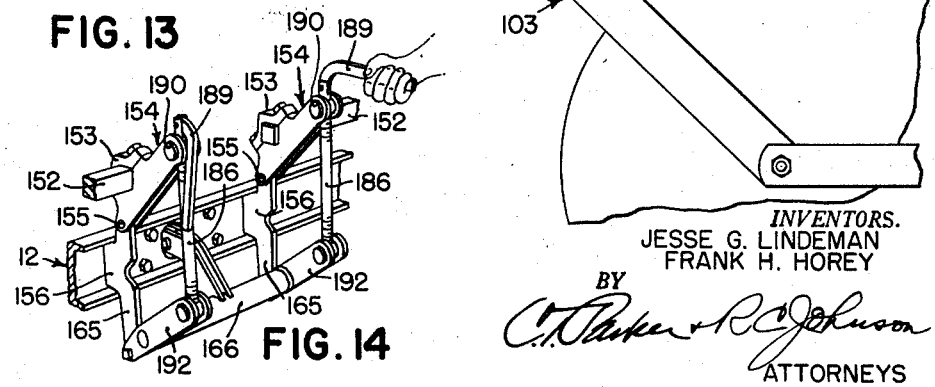
Fig. 14 is a fragmentary perspective view showing a portion of the adjusting connections for each gauge wheel unit.

Each of the upper link members 108 carries a clamp member 151 in which the outer end of a cross arm 152 is fixed. The inner end of the cross arm 152 is connected by similar clamp means 153 to a swingable arm 154 that is pivotally mounted, as at 155 (Figure 14), on a bracket 156 that is fixed to the rear side of the transverse frame member 12. The latter member is bolted, as at 158 (Fig. 11), to a cross plate 159 (Fig. 1) that is welded to the rear end of the frame member 11, forming an attachment flange for the latter member. Each cross arm 152, with the associated link member 108 and swingable arm 154, constitutes a rockable member supported on the transverse frame member 12 and swingable about an axis defined by the pivots 116 and 155. The plate or flange section 159 and the web of the frame member 12 are apertured, as at 161, to provide a central opening aligned with the interior of the rear frame section 37, there being a bracket 156 and associated pivoted arm 154 at each side of the opening 161. Each of the brackets 156 is provided with a lower depending section 165 (Fig. 14), and supported in the lower portions of the bracket sections 165 is a part 166 to the central portion of which an arm 167 (Figure 11) is fixed. The outer end of the arm 167 is apertured to receive a pivot pin 168 by which the rear end 169 (Fig. 11) of a generally fore-and-aft extending push pipe 171 is connected. As will best be seen from Figs. 1, 2 and 11, the pipe 171 extends through the openings 161 and through the rear portion of the frame member 11, emerging from the latter through an opening 172 (Fig. 1) and then continuing outside the frame member 11, where, at the forward end portion of the member 171, the latter is slidably supported in a bracket 175 fixed to the forward end portion of the frame member 11. Thus, the bracket 175 serves as support for the forward portion of the push pipe 171. A cylinder mounting bracket 176 is fixed to the forward portion of the front frame section 35 and serves as a support for receiving the front end of a power unit 177, preferably in the form of a hydraulic cylinder or jack having a pair of hose lines 178 by which fluid under pressure may be delivered to and discharged from the unit 177. The latter includes a fore-and-aft movable piston rod 181 that is pivotally connected, as at 182, to the front end of the push pipe 171, the latter serving as a control rod delivering power from the unit 177 rearwardly to the rockshaft 166 for the purpose of raising and lowering the rear end of the frame relative to the gauge wheels 102. Secured to the rear end of each of the rockshaft-carried arms 154 is a vertically extending link member 186 the lower end of which is threaded, as at 187 (Fig. 11), while the upper end is rotatably carried in a swivel 188 mounted on a pivot pin 190. The upper end of each of the threaded members 186 carries an actuating handle 189. The lower threaded end 187 of each link 186 extends into a threaded swivel 191 carried by a bifurcated arm 192 fixed at an intermediate point to one end of the part 166. The blade 45 may be tilted by actuating one or the other, or both, of the handles 189 so as to change the position of one of the gauge wheels relative to the other, or both of them relative to the rear end of the frame 10. The part 166, the arm 167 and the arms 192 constitute a rockable member connecting the end 169 of the push pipe 171 with the members 186.

The opening 172 that is formed in the upper portion of the intermediate frame section 36 is produced in a forming operation that is illustrated in Figs. 15 and 16.

In order to produce an opening through which the pipe or control rod 171 may be brought forwardly from the interior of the frame member 11 without sacrificing to any material extent any of the strength of the section, a split 200 (Fig. 4) is first formed, either before or after the initial bending operation, and then after the section 36 is brought into V-shaped formation, but before the lower plate 41 is welded thereto, the stock immediately forward of the slit 200 is bent downwardly, as at 201 (Fig. 15), while the stock 202 (Fig. 16) is pressed upwardly and inwardly, thereby providing a substantially round opening through which the rod or pipe member 171 may extend, as best shown in Fig. 2.

The forward end of the rod or control member 171 is provided with a pair of front vertical slots 206 and a pair of rear vertical slots 207, there being one of each of said slots at each side of the member 171 as will be seen from Figs. 1 and 2. These slots are adapted to receive a generally U-shaped locking member 208, Figs. 17 and 18. The locking member 208 has leg sections 211 and 212 spaced apart so as to be disposable about the rod or control member 171 with the legs disposed in one or the other of the sets of slots 206 or 207. The U-shaped member 208 forms a transport lock collar and normally is connected by a chain 213 to the bracket or support 175 when the lock is not applied to the rod or push member 171, as when in normal operation, as shown in Fig. 1.

The operation of the implement described above is substantially as follows.

When the front end of the implement is supported on the ball connector 23 carried by the drawbar D of the tractor, and the rear end of the implement is supported or gauged by the ground wheels 102, the hydraulic unit 177 being adjusted for maximum depth in the position shown in Fig. 2, the scraper blade is in a position to level the ground and the implement as a whole is supported at a single point at the front end and at two points, namely, the ground wheels 102, at the rear. This provides a stable support for the implement, and it will be seen from Fig. 2, the blade 45 is located within the last one quarter of the total length of the frame 10, whereby there is a substantial distance between the blade 45 and the front support of the frame. Thus, as the tractor passes over ground inequalities, and moves up and down in consequence thereof, the position of the blade will vary only by a slight amount, the rear wheels 102 being located so as to run on the leveled ground. At the same time, the gauge wheels 102 are located some distance rearwardly of the blade 45, so that they have at least some mechanical advantage so far as supporting the blade from the leveled ground is concerned, whereby the wheels 102 do not to any appreciable extent tend to sink into the leveled ground surface.

When it is desired to transport the implement through relatively short distances, all that it is necessary to do is to operate the hydraulic unit 177 so as to extend the piston rod section 181 rearwardly, thus exerting a rearwardly directed force or push through the control rod 171. This rocks the part 166 in a direction to pull downwardly through the arms 192 and links 186 against the upper arms or links 154. This acts through the crossbars 152 to swing the upper caster wheel link members 108 downwardly at their rear ends, elevating the frame with respect to the gauge wheels 102 to substantially the position shown in Fig. 18 and lifting the blade clear of the ground surface. At the same time that the link members 108 are swung downwardly at their rear ends, extensions 215 on the upper link members 108 act to lower a locking bar 216 into a position between an abutment 218 on the associated caster wheel spindle sleeve 107 and the crossbar or connecting portion 145 of the associated caster wheel locking lever 131. Preferably, the connection between the extensions 215 and the link 216 includes a cushioning spring 221 acting between the lower end of a slot 222 in the bar 216 and the cross pin 223 that, carried by the extensions 215, pass through the upper end of the associated slot 222. Thus, in the raised position of the frame with respect to the gauge wheels 102, the downward movement of the locking bars 216 serves positively to hold the levers 131 in their casterwheel locking position. Thus, with the blade elevated, the implement as a whole merely trails behind the tractor and does not drift laterally, as would be the case if the wheels 102 were permitted to caster when the blade is raised.

If it should be desired, as when transporting the implement, Fig. 18, to provide for the removal of the hydraulic unit 177 while still holding the frame and blade elevated with respect to the gauge wheels 102, all that it is necessary to do is to insert the locking member 208 in the rear set of slots 207, just in rear of the bracket or support 175. Then by relaxing the pressure in the unit 177, the locking member 208 sustains the weight of the elevated parts and the cylinder 177 may readily be removed. Thus, the implement may be transported by a tractor which does not have a power cylinder and associated power lift means.

Figure 19:
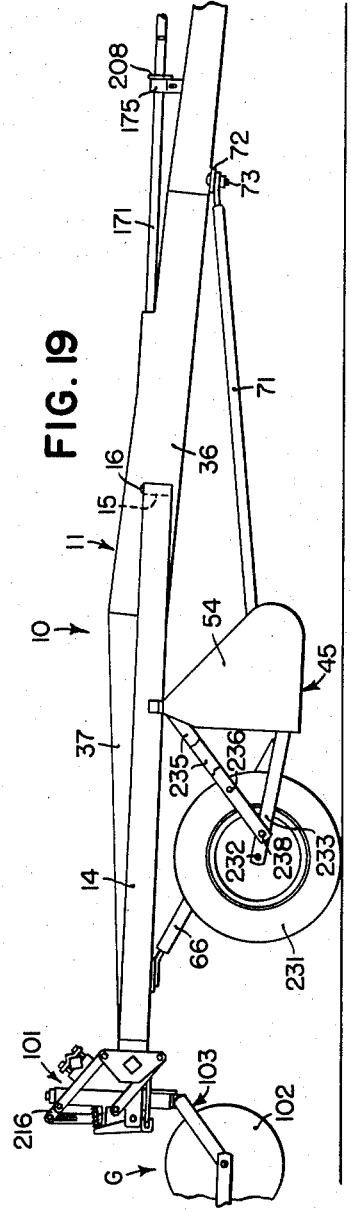
Fig. 19 is a view similar to Figs. 2 and 18, showing the parts when the implement is being carried on rubber-tired transport wheels, particularly adapting the implement for highway travel at relatively high speeds.

The gauge wheels 102, as will be seen from Fig. 11, have wide flat tread sections and are usually formed of steel. While steel wheels are adequate for transporting the implement across fields, country roads and the like, it is sometimes necessary to transport implements of this type along paved highways and at a fairly high rate of speed. To take care of such situations, we provide a transport attachment, best shown in Figs. 1, 2 and 19, which comprises a pair of rubber-tired wheels 231 having axle section 232 that are pivotally connected with the end portions of the blade 45 by a pair of bars 233 that are pivotally connected to brackets 234 fixed to the rear side of the blade 45. A pair of brace bars 235 are pivotally connected at their upper ends to the upper portion of the blade 45. Each of the upper bars 235 is provided with two openings 236 and 237, and forward of the axle 232, each of the lower bars 233 is apertured to receive a detachable pin 238. Normally, the transport wheel arrangement is carried at all times on the implement, and when in leveling operation, as shown in Fig. 2, the bars 233 and 235 are arranged as shown in Fig. 2, with the connecting pins 238 in the forward holes 236, so as to hold the transport wheels 231 in an upper and inoperative position. When it is desired to transport the implement on the transport wheels 231, all that it is necessary to do is, first, raise the frame and blade to the maximum amount, as by fully extending the hydraulic unit 177 which is the position shown in Fig. 18. Then, by momentarily manually raising the wheel 231, pressure on the pin 238 can be relieved, and the pin 238 removed and the wheel 231 dropped down to the position shown in Fig. 19, after which the pin 238 is then placed in the rear hole 237. Lastly, the cylinder 177 is then operated to raise the gauge wheels 102 entirely off the ground, into the position shown in Fig. 19, the gauge wheels 102 being raised to a point sufficient to bring the slots 207 to a position just in front of the support 175. Then by inserting the locking member 208 in the slots 207, the weight of the gauge wheels in their raised position will be sustained by the locking collar 208, whereupon the cylinder 177 may then be removed. One advantage of providing transport wheels immediately in rear of the blade is that the implement may be transported over uneven ground without danger of the blade striking any of the high spots, which might conceivably occur when the blade is transported only on the rear gauge wheels 102 (Fig. 18), since the latter wheels are a substantial distance in rear of the blade 45.

While we have shown and described above the preferred structure in which the principles of the present invention have been incorporated, it is to be understood that our invention is not to be limited to the exact details shown and described above, but that, in fact, widely different means may be employed in the practice of the broader aspects of our invention.

What we claim, therefore, and desire to secure by Letters Patent is:

1. In a land leveler, a main generally fore-and-aft extending frame, an earth-scraping blade carried by said frame at a point forward of the rear end thereof, and ground wheel means connected supportingly with the rear end of said frame, the latter comprising a plurality of generally inverted V-shaped members, there being a front member, an intermediate member, and a rear member, each member having side sections the generally vertical dimension of which progressively increases from one end to the other, said members being rigidly joined in end-to-end relation, the side sections at the rear end of the front member having the same dimension as the side sections at the front end of the adjacent intermediate member, and the side sections at the rear end of the intermediate member that is joined to the rear member having the same vertical dimension as the side sections at the front end of the rear member, the angles between the side sections of the several members being substantially the same, the vertical dimension of the side sections of the intermediate member progressively increasing to a maximum at the rear end thereof, and the vertical dimension of the rear member progressively decreasing from the forward end to the rear end thereof, said blade being fastened to said frame at a point adjacent the maximum vertical dimension of said side sections.

2. In a land leveler, a frame including an elongated member consisting of flat stock bent into generally inverted V-shape, and an elongated flat plate section rigidly secured at its side edges to the lower side portions of said V-shaped member, said flat plate section having one or more keyhole slots therein, an earth engaging blade, and means connecting said blade to said flat plate section, said blade connecting means including one or more fasteners removably received in said one or more keyhole slots.

3. A land leveler comprising a generally fore-and-aft extending frame, a transverse leveling blade secured to the frame forward of the rear end thereof, a pair of gauge wheels connected with the rear portion of said frame and mounted thereon for generally vertical adjustment and for lateral castering movement, means connected with said gauge wheel for raising and lowering the latter, and caster lock-out means connected with said caster wheels and said raising and lowering means for preventing castering of said wheels when the frame is raised relative to said gauge wheels.

4. The invention set forth in claim 8, further characterized by each of said gauge wheels being connected with said frame for generally vertical movement relative thereto by upper and lower pairs of generally parallel links, and said caster lock-out means including a locking part connected with certain of said links to be moved thereby relative to the associated gauge wheel for locking the latter when the frame is raised.

5. A land leveler comprising a generally fore-and-aft extending frame, a leveling blade carried thereby and disposed in generally transverse relation, a pair of caster wheels connected with the rear portion of said frame for generally vertical shifting movement and laterally swingable movement, spring-biased means acting against said caster wheels for yieldably opposing lateral swinging of said wheels relative to the frame, means connected with said frame and caster wheel for raising the frame relative to said wheels, and means connected with said raising and lowering means and said yieldable means for positively holding said caster wheels against lateral swinging when the frame and blade are raised.

6. A land leveler comprising a generally fore-and-aft extending frame, a generally transverse leveling blade fixed to said frame at a point forwardly of the rear end thereof, said frame including at its rear end a generally transverse frame bar, a pair of ground wheels connected with the end portions of said frame bar for generally vertical movement relative thereto, a pair of rockable members supported on said transverse frame bar and each connected at its outer end with the associated ground wheel for raising and lowering the latter relative to said frame, a single power exerting unit carried by said frame and including means extending to a point disposed generally between said rockable members, and individual connections between said last mentioned means and the laterally inner ends of said rockable members.

7. A land leveler comprising a generally fore-and-aft extending frame, a generally transverse leveling blade fixed to said frame at a point forwardly of the rear end thereof, said frame including at its rear end a generally transverse frame bar, a pair of ground wheels connected with the end portions of said frame bar for generally vertical movement relative thereto, a pair of rockable members supported on said transverse frame bar and each connected at its outer end with the associated ground wheel for raising and lowering the latter relative to said frame, the latter including a generally hollowed, fore-and-aft extending part, said transverse frame member having an opening generally centrally thereof communicating with the opening in said hollow frame part, a pair of brackets fixed to said transverse frame member at opposite sides of said opening, a third rockable member rockably supported by said brackets and operatively connected with the laterally inner ends of said pair of rockable members, and a generally fore-and-aft movable part supported at least partially in said hollow fore-and-aft extending frame member and extending rearwardly through the opening in said transverse frame member and connected with said third rockable member.

8. In a land leveler, a main frame including a hollow, generally fore-and-aft extending member, generally vertically adjustable gauge wheel means at the rear end of said frame, there being an opening in the front portion of said generally hollow frame member, a gauge wheel adjusting member extending substantially the length of said fore-and-aft extending member and disposed within the latter and connected at its rear end with said vertically adjustable gauge wheel means, the forward portion of said gauge wheel adjusting member extending outwardly through said opening and disposed exteriorly of said frame member, and means carried at the front end of the latter and connected with said gauge wheel adjusting member for shifting the same in a generally fore-and-aft direction for operating said gauge wheel means.

9. A land leveler comprising a generally fore-and-aft extending frame, a transverse leveling blade secured to the frame a substantial distance from the rear end thereof, gauge wheel means connected for generally vertical adjustment with the rear end of said frame to gauge the depth of cut of said blade, and means to raise said gauge wheel means out of engagement with the ground when said transport wheel means is lowered to a point below said leveling blade, said gauge wheel raising means comprising a fore-and-aft movable part, support means on said frame movably receiving said part, a detachable power unit connectible between said frame and said part for shifting the latter, and a detachable lock engageable with said part, when said gauge wheel means is in a raised position, and acting against said support for holding said gauge wheel means in said raised position and accommodating removal of said detachable power unit.

10. A land leveler comprising a generally fore-and-aft extending frame, a transverse leveling blade secured to the frame a substantial distance from the rear end thereof, gauge wheel means connected for generally vertical adjustment with the rear end of said frame to gauge the depth of cut of said blade, transport wheel means disposed immediately adjacent the blade on the rear side, means connecting the transport wheel means with the frame in either of two positions, one above and the other below the cutting edge of said leveling blade, a generally fore-and-aft shiftable part movably mounted on said frame and connected to raise and lower said gauge wheel means, a bracket on said frame supporting the forward portion of said part, a power unit detachably connected between said frame and said part for shifting the latter along said frame, said part including a pair of lock-receiving means so spaced on said part that, when the gauge wheel means is lowered into a position providing for transport of said frame while supported on said gauge wheel, one of said lock-receiving means is disposed at the rear side of said support, the second lock-receiving means being disposed, when said gauge wheel means is moved into its raised position, on the forward side of said support, and a support-engaging lock disposable in said lock-receiving means to provide for locking said gauge wheel means in its lowered position as well as in its raised position.

11. An agricultural implement comprising means serving as a frame, a caster wheel unit including a spindle member connected with said frame means for generally vertical shifting movement and laterally swingable movement, spring-biased means acting against said caster wheel spindle for yieldably opposing lateral swinging thereof relative to said frame means, means connected with said frame means and said spindle for raising said frame means relative to said spindle, and means connected with said raising and lowering means and said yieldable means for positively holding said caster wheel spindle against lateral swinging when said frame means is raised.

12. An agricultural implement as defined in claim 11, further characterized by said spring biased means including a part movable toward and away from said spindle, and said holding means including a member movable by movement of said raising and lowering means into and out of a position blocking movement of said movable part.

13. In an agricultural implement, means serving as a frame, a sleeve movably connected with said frame means, a caster wheel spindle disposed for rocking movement in said sleeve, a part movably mounted on said sleeve and releasably engageable with said spindle for opposing rocking of the latter in said sleeve, means connected with said sleeve to raise and lower said sleeve relative to the frame means, a member movable relative to said part, and means connected with said raising and lowering means for moving said member into a position locking said part in locking engagement with said spindle.

14. In an agricultural implement, means serving as a frame, a generally vertical sleeve, generally horizontal link means connecting said sleeve with said frame means for generally vertical movement relative thereto, a caster wheel spindle disposed for rocking movement in said sleeve, a part movably mounted on said sleeve and releasably engageable with said spindle for opposing rocking of the latter in said sleeve, means connected with said link means to raise and lower said sleeve relative to the frame means, a member movable relative to said part, and means connected with said raising and lowering means for moving said member into a position locking said part in locking engagement with said spindle.

15. In an agricultural implement, means serving as a frame, a generally vertical sleeve, generally horizontal link means connecting said sleeve with said frame means for generally vertical movement relative thereto, a caster wheel spindle disposed for rocking movement in said sleeve, a part movably mounted on said sleeve and releasably engageable with said spindle for opposing rocking of the latter in said sleeve, means connected with said link means to raise and lower said sleeve relative to the frame means, a member movable relative to and engageable with said part, and means including yieldable spring means connecting said member with said link means.

16. In an agricultural implement, means serving as a frame, a generally vertical spindle-receiving sleeve, upper and lower generally parallel links movably connecting said sleeve with said frame means, a caster wheel spindle journaled in said sleeve, caster locking means carried by said sleeve, an extension on one of said links, and a connection between said extension and said caster locking means for operating the latter by movement of said frame relative to said sleeve.

17. In an agricultural implement, means serving as a frame, a generally vertical spindle-receiving sleeve, upper and lower generally parallel links movably connecting said sleeve with said frame means, a caster wheel spindle journaled in said sleeve, a lever pivoted on said sleeve and having a portion engageable with said spindle, an extension on one of said links, and a connection between said extension and said lever for forcing the latter into engagement with said spindle.

18. In an agricultural implement, means serving as a frame, a generally vertical spindle-receiving sleeve, upper and lower generally parallel links movably connecting said sleeve with said frame means, a caster wheel spindle journaled in said sleeve, a cam on said spindle, a lever pivoted on said sleeve and having a portion engageable with said cam for yieldably restraining rotation of said spindle in said sleeve, spring means acting between said sleeve and said lever, an extension on one of said links, and a connection between said extension and said lever for holding the latter in caster locking position.

19. A land leveler comprising frame means including a generally fore-and-aft extending part and a generally transversely extending part connected to the rear end of said fore-and-aft extending part, a pair of transverse rockable members mounted, respectively, on the end portions of said transversely extending part, a gauge wheel movably connected with the laterally outer end of each of said rockable members, a central rockable member mounted on said transversely extending part and connected at its outer ends, respectively, with the laterally inner ends of said transverse rockable members, and operating means connected with said central rockable member.

20. A land leveler as defined in claim 19, further characterized by a pair of laterally outwardly extending supports fixed to the end portions of said transversely extending part, said transverse rockable members extending laterally outwardly alongside said supports, and said gauge wheels being connected for lateral adjustment along said supports and said transverse rockable members.

References Cited in the file of this patent

UNITED STATES PATENTS

| | | |
|---|---|---|
| 1,709,081 | Le Tourneau | Apr. 16, 1929 |
| 2,196,037 | Silver | Apr. 2, 1940 |
| 2,314,888 | Manning | Mar. 30, 1943 |
| 2,334,888 | Strandlund | Nov. 23, 1943 |
| 2,339,327 | Fox | Jan. 18, 1944 |
| 2,526,130 | Gurries et al. | Oct. 17, 1950 |
| 2,635,519 | Cook | Apr. 21, 1953 |
| 2,650,441 | Shumaker | Sept. 1, 1953 |

UNITED STATES PATENT OFFICE

CERTIFICATE OF CORRECTION

Patent No. 2,843,948                                             July 22, 1958

Jesse G. Lindeman et al.

It is hereby certified that error appears in the printed specification of the above numbered patent requiring correction and that the said Letters Patent should read as corrected below.

Column 9, line 50, for the claim reference numeral "8" read --3--.

Signed and sealed this 14th day of October 1958.

(SEAL)
Attest:

KARL H. AXLINE
Attesting Officer

ROBERT C. WATSON
Commissioner of Patents